(12) United States Patent
Dal Pra'

(10) Patent No.: US 6,725,740 B2
(45) Date of Patent: Apr. 27, 2004

(54) COMBINED GEAR CHANGE AND BRAKE CONTROL UNIT FOR A BICYCLE

(75) Inventor: Giuseppe Dal Pra', Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 10/039,116

(22) Filed: Jan. 10, 2002

(65) Prior Publication Data

US 2002/0104401 A1 Aug. 8, 2002

(30) Foreign Application Priority Data

Jan. 11, 2001 (IT) .................................... TO2001A0010

(51) Int. Cl.[7] .............................................. B62K 23/06
(52) U.S. Cl. ........................ 74/502.2; 74/489; 74/535
(58) Field of Search ........................... 74/502.2, 502.4, 74/489, 471 R, 501.6, 535, 473.13, 473.14

(56) References Cited

U.S. PATENT DOCUMENTS

| 4,132,296 A | * | 1/1979 | Evett ........................... 192/217 |
| 5,134,897 A | * | 8/1992 | Romano ....................... 74/489 |
| 5,213,005 A | * | 5/1993 | Nagano ...................... 74/502.2 |
| 5,241,878 A | * | 9/1993 | Nagano ...................... 74/502.2 |
| 5,257,683 A | * | 11/1993 | Romano ....................... 192/217 |
| 5,361,645 A | * | 11/1994 | Feng et al. .................. 74/502.2 |
| 5,588,331 A | * | 12/1996 | Huang et al. .................. 74/489 |
| 5,660,083 A | * | 8/1997 | Huang et al. ............... 74/502.2 |
| 5,676,022 A | * | 10/1997 | Ose ............................. 74/502.2 |
| 5,730,030 A | * | 3/1998 | Masui ...................... 74/473.13 |
| 5,732,598 A | * | 3/1998 | Shoge et al. ............. 74/473.13 |
| 5,802,923 A | * | 9/1998 | Hara ....................... 74/473.13 |
| 5,806,372 A | * | 9/1998 | Campagnolo ............ 74/473.14 |
| 5,832,782 A | * | 11/1998 | Kawakami ............... 74/473.13 |
| 5,957,002 A | * | 9/1999 | Ueng ........................ 74/502.2 |
| 6,067,875 A | * | 5/2000 | Ritchey et al. ............ 74/502.2 |

FOREIGN PATENT DOCUMENTS

GB          WO 90/09306     *  8/1990

* cited by examiner

Primary Examiner—David A. Bucci
Assistant Examiner—Julie K. Smith
(74) Attorney, Agent, or Firm—Volpe and Koenig, P.C.

(57) ABSTRACT

A combined gear change and brake control unit for a bicycle is provided. The unit comprises a support body connected to a brake control lever pivoting around a first axis and a gear change control unit connected to the support body. This control unit comprises a gear change lever pivoting on a second axis, orthogonal with respect to the first axis, for shifting the gear. The gear change lever is arranged immediately behind the brake control lever and is free to oscillate in the same direction as the latter lever to prevent obstructing the brake control movement.

13 Claims, 4 Drawing Sheets

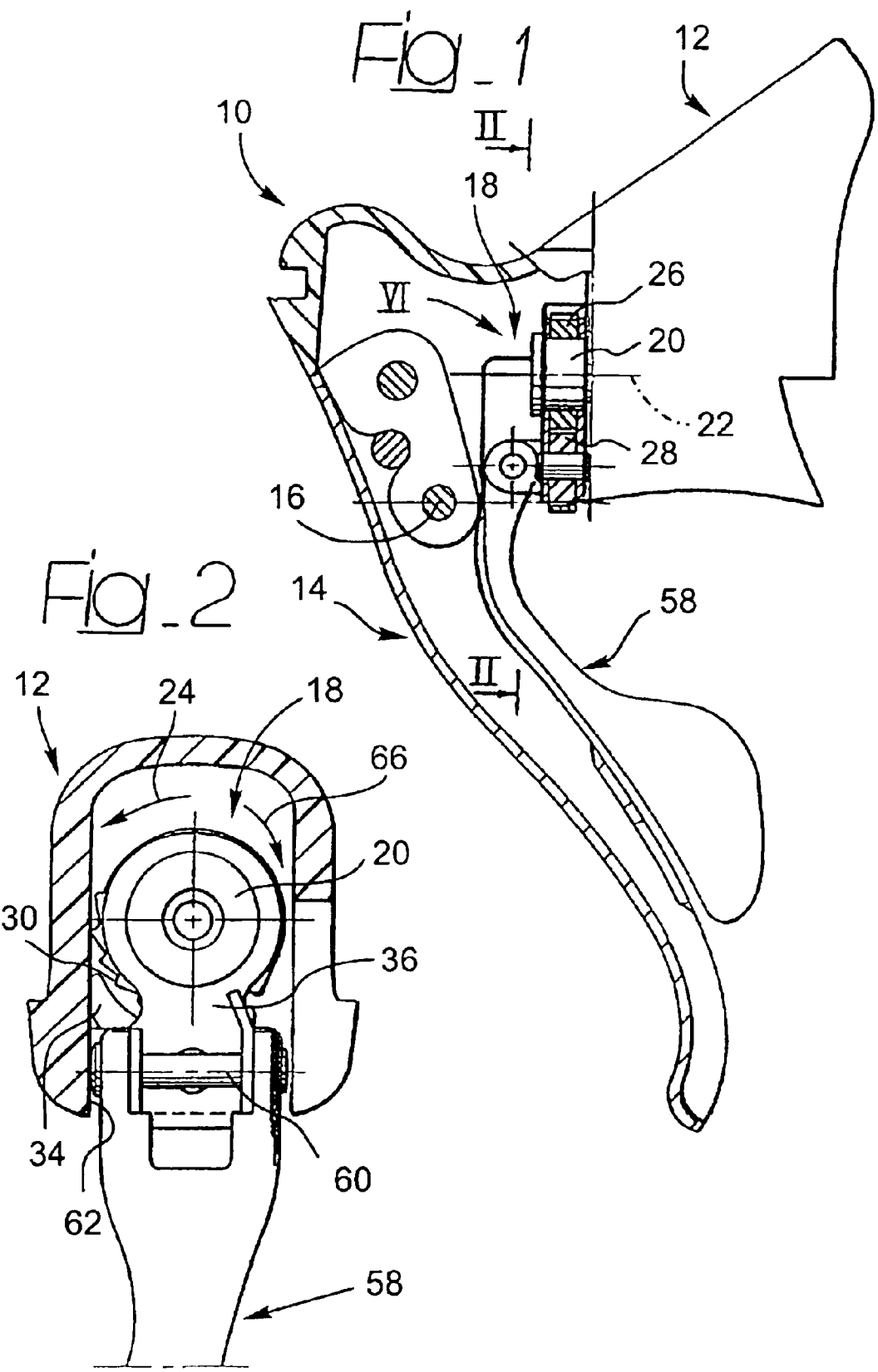

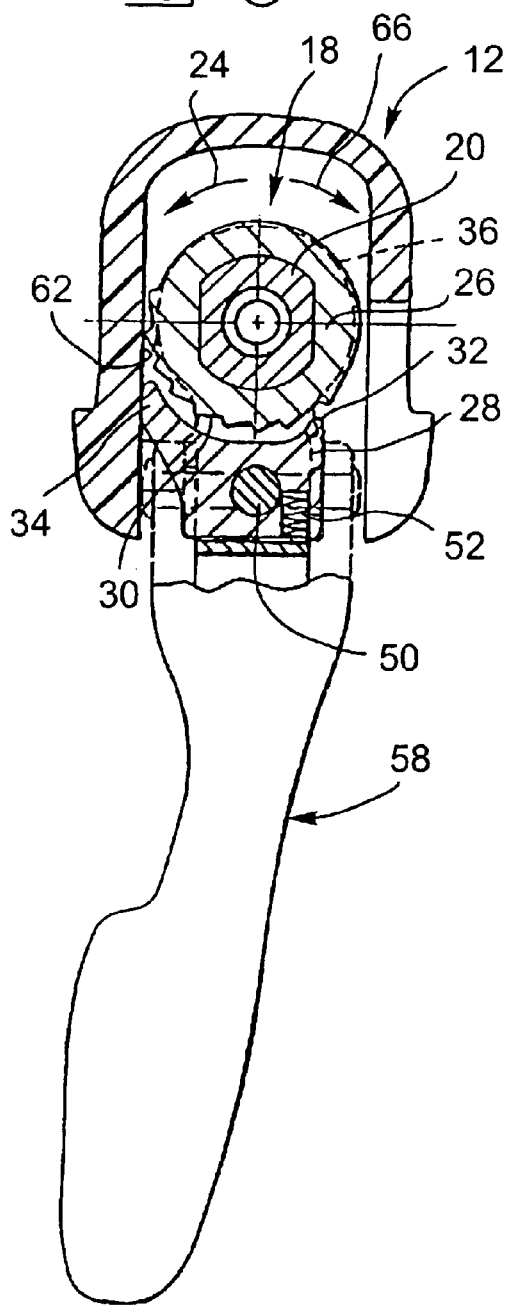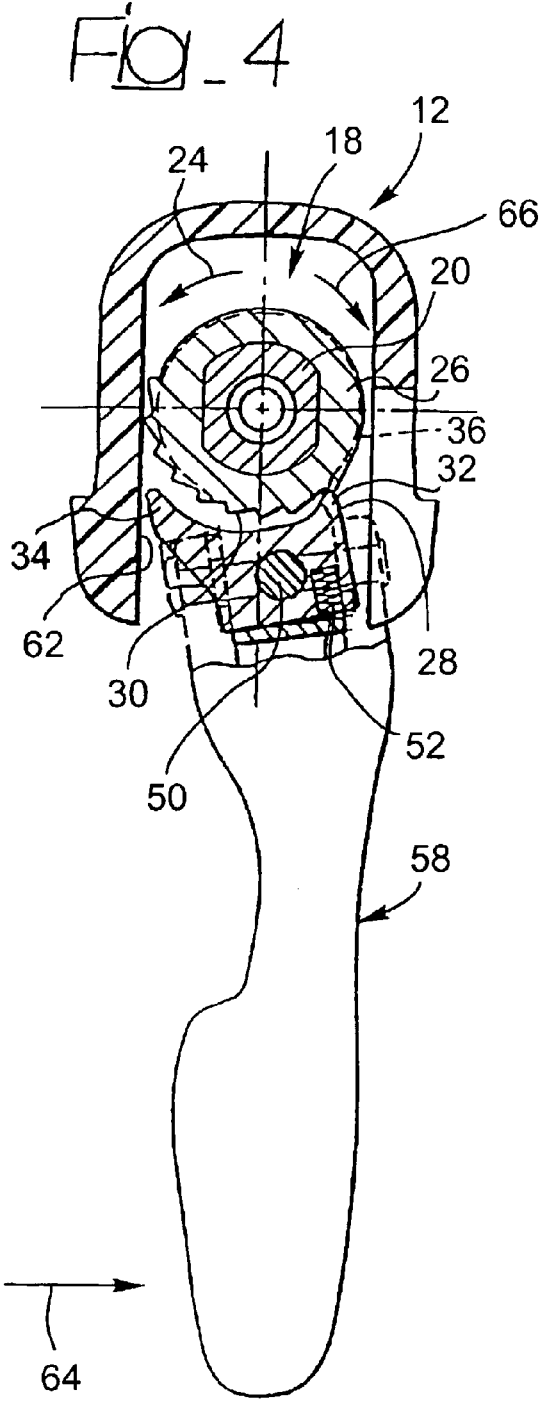

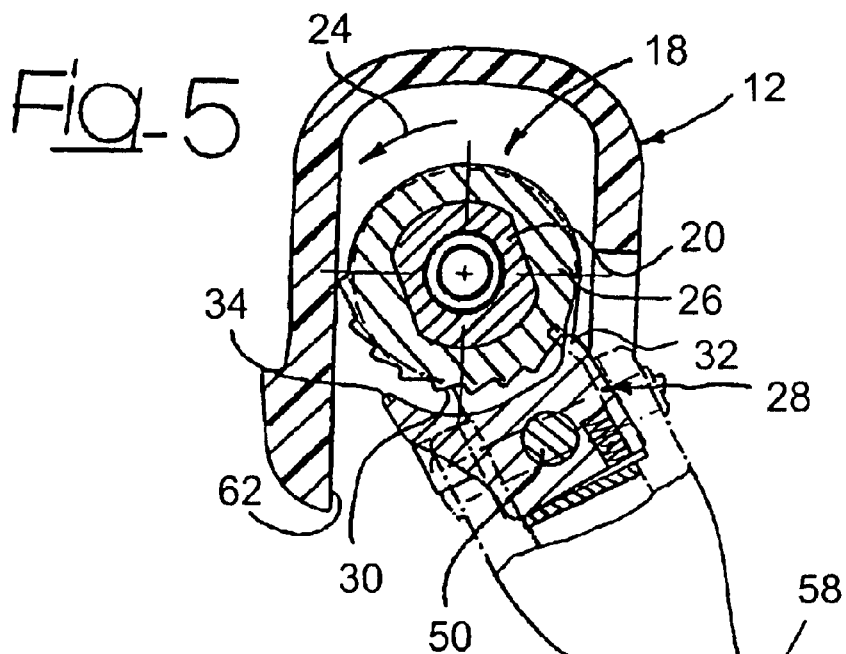
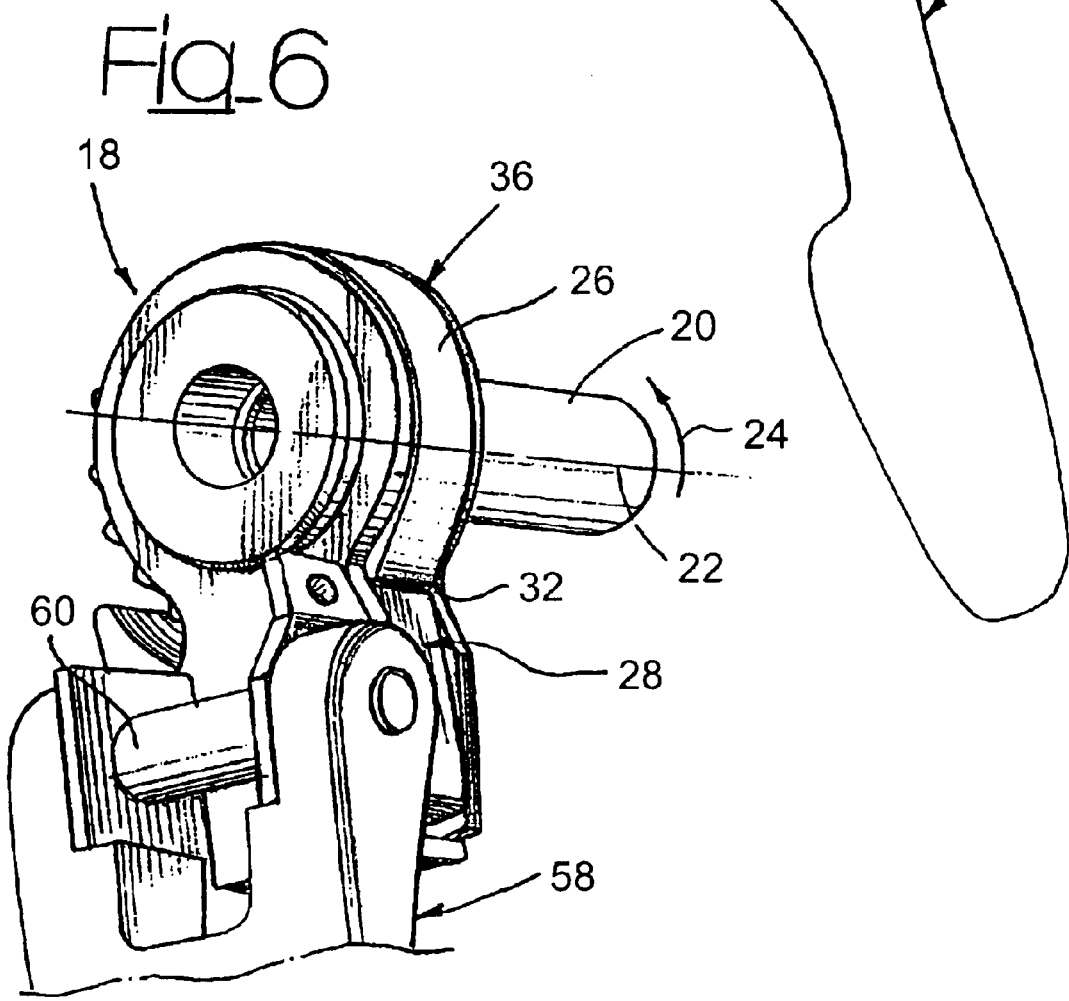

Fig_7
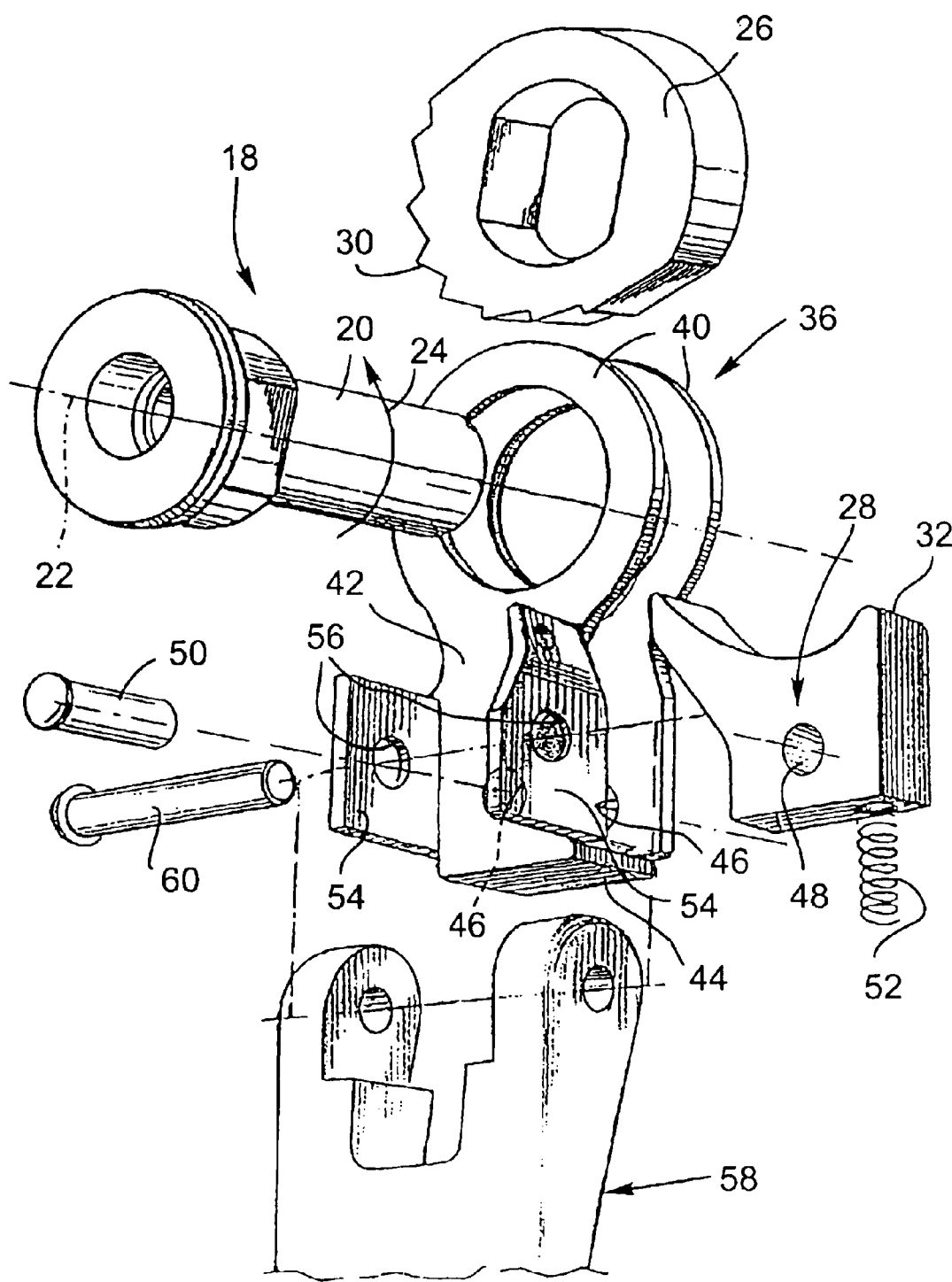

COMBINED GEAR CHANGE AND BRAKE CONTROL UNIT FOR A BICYCLE

BACKGROUND OF THE INVENTION

This invention relates to a combined gear change and brake control unit for a bicycle. More precisely, this invention relates to a combined unit of the type described by the Applicant in document EP 0 504 118, which is incorporated by reference herein as if fully set forth. This document describes a combined control unit comprising a support body connected to a brake control lever pivoting around a first axis and a gear change control unit connected to the support body. This control unit comprises a gear change lever pivoting on a second axis, orthogonal with respect to the first axis, for shifting the gear. The gear change lever is arranged immediately behind the brake control lever and is free to oscillate in the same direction as the latter lever to prevent obstructing the brake control movement.

The previously described unit comprises a shaft turnable around said second axis, co-operating with a control cable of a derailleur. The rotation of the shaft is controlled by a ratchet mechanism, comprising a gear solidly fastened to the shaft. The gear change lever controls the rotation of the shaft via a meshing unit which meshes said gear. In the known solution, the meshing unit is pivotally connected to a connecting element, which is mounted on the shaft so that it is free to turn with respect to the second axis. The gear change lever is carried so to oscillate on the meshing unit. In home conditions, the meshing unit is not in contact with the gear teeth. When the gear change lever oscillates around said second axis, the lever must travel a small angular stroke to take the meshing unit into contact with the teeth. After this small idle stroke, the rotation movement of the gear change lever produces a rotation which amplitude is equal to the one of the shaft thanks to the contact between the meshing unit and the teeth.

SUMMARY OF THE INVENTION

The objective of this invention is to provide a gear change control unit which is constructively more simple and cost-effective than the known solution, reducing the angular stroke of the gear change lever required to take the meshing unit into contact with the teeth.

According to this invention, these objectives are attained by means of a combined control unit which characteristics are described in the main claim.

BRIEF DESCRIPTION OF THE DRAWINGS

This invention will be better explained by the following detailed descriptions with reference to the accompanying figure as non-limiting example, whereas:

FIG. 1 is a lateral partially sectioned view of a control unit according to this invention, FIG. 2 is a section according to the line II—II in FIG. 1, FIGS. 3, 4 and 5 are sections similar to FIG. 2 illustrating the control unit in three different operative configurations, FIG. 6 is a perspective view of the part indicated by arrow VI in FIG. 1, and FIG. 7 is a perspective exploded view of the components shown in FIG. 6.

DETAILED DESCRIPTION OF THE INVENTION

With reference to FIG. 1, numeral 10 indicates a combined gear change and brake control unit of a competition bicycle. Unit 10 essentially works as the unit described in the previous patent application EP 0 504 118 by the Applicant to which reference is made for all aspects not expressly illustrated in this description.

The integrated control unit 10 comprises a support body 12 with means (not illustrated) for fastening to the handlebar of a bicycle (also not illustrated). A brake control lever 14 is pivotally fastened to the support body 12 around a first axis formed by a pivot 16. In the known way, an end of a brake control cable is anchored to an upper end of the lever 14.

The support body 12 carries a gear change unit, generally referred to with numeral 18. With particular reference to FIGS. 6 and 7, the gear change unit 18 comprises a shaft 20 turningly connected to the support body 12 around a second axis 22, either orthogonal, or essentially orthogonal, to the pivoting axis 16 of the brake control lever 14. The shaft 20 carries a pulley (not shown) on which an end portion of a control cable of a front or rear derailleur of a bicycle is wound. The rotation of the shaft 20 in a first direction, indicated by arrow 66 in FIGS. 2, 3 and 4, additionally winds the derailleur control cable on the pulley, while a rotation of the shaft 20 in the opposite direction with respect to that indicated by the arrow 24 releases the control cable of the derailleur. The mechanism controlling the rotation of the shaft 20 in the direction opposite to that shown by the arrow 24 is not described herein because it is not included in the scope of this invention. This mechanism can be made as described in detail in document EP 0 504 118. The mechanism controlling the rotation of the shaft 20 around the axis 22 in the direction of the arrow 24 will be described hereof.

With reference to FIGS. 6 and 7, the rotation of the shaft 20 in the direction indicated by the arrow 24 is controlled by a ratchet mechanism comprising a gear 26 and a meshing unit 28. The gear 26 is fastened to the shaft 20 and is equipped with saw-shaped teeth 30. The meshing unit 28 comprises a tooth 32, which is destined to co-operate with teeth 30, and an appendix 34, which function will be explained below. The meshing unit 28 carries a connection element 36, having substantially the shape of a connecting rod. In the form of embodiment illustrated in the figures, the connecting element 36 is made of pressed bent metal sheet and presents two substantially annular portions 40, facing each other, which engage the shaft 20 on opposite sides with respect to the gear 26. The connecting element 36 is mounted on the shaft 20 so to free turn with respect to the axis 22. With reference to FIG. 7, the two annular portions 40 of the connecting element 36 present respective extensions 42, mutually connected by a base 44. The extensions 42 have respective aligned holes 46. The meshing unit 28 is equipped with a hole 48, which engages a pivot 50 which, in turn, engages the aligned holes 46 of the extensions 42. The axis of the pivot 50 is either parallel or substantially parallel to said second axis 22. The meshing unit 28 is connected to the connecting element 36 so to freely oscillate around the pivot 50. An elastic element, for example consisting of a compressed coil spring 52, is arranged between the base 44 and the meshing unit 28 so to push the meshing unit 28 towards a position in which the tooth 32 engages the teeth 30 of gear 26.

With particular reference to FIG. 7, one of the two extensions 42 of the connecting element 36 (the one facing forwards) is equipped with a pair of flanges 54 which are mutually parallel and facing one another, provided with respective aligned holes 56. A gear change lever 58 is pivotally mounted to the flanges 54 of the connecting element 36 by means of a pin 60 in which the axis is either orthogonal, or substantially orthogonal, to the second axis.

With reference to FIGS. 6 and 7, the upper end of the gear change lever 58 is fork-shaped and engages the flanges 54 so that the gear change lever 58 is fastened to the connecting element 36 for oscillation around the axis 22. Conversely, the gear change lever is free to oscillate with respect to the connecting element 36 around the pivot 60. In this way, the gear change lever 58 is free to follow the oscillation movement of the brake control lever 14 around the first axis, materially represented by the pivot 16.

With reference to FIGS. 1 and 2, the connecting element 16 co-operates with a return spring (not shown), which tends to return the connecting element 36 and the gear change lever 58 to the home position shown in FIGS. 2 and 3, after that the gear change lever 58 is released after an oscillation around the axis 22 in the direction shown by the arrow 24. A second return spring (not shown) co-operates with the lever 58 and tends to return said lever to the position shown in FIG. 1 after an oscillation around the pivot 60 due to braking movement of the brake control lever 14. The return spring and second return spring are shown in FIGS. 1 and 6 of EP 0 504 118 as reference numbers 56 and 60 respectively.

The operation of the unit according to this invention will now be described with reference to FIGS. 3, 4 and 5. FIG. 3 shows the home position of the gear change lever 58. As mentioned above, the return spring associated to the connecting element 36 tends to make the connecting element turn in the opposite direction with respect to that shown by the arrow 24. In the home position shown in FIG. 3, the appendix 34 of the meshing unit 28 rests on an inner surface 62 of the support body 12 and holds the meshing unit 28 in a position in which the tooth 32 of the meshing unit 28 is engaged by the teeth 30. The inner surface 62 of the support body 12 also defines an end of stroke stop, against which the gear change lever 58 is pushed by the action of the return spring associated to the connecting element 36, so to define a reference position for the gear change lever 58.

With reference to FIG. 4, for shifting the gear in a certain direction, the cyclist impresses an oscillation on the gear change lever 58 in the direction shown by the arrow 64. The oscillation of the lever 58 generates an oscillation which amplitude is equal to that of the connecting element 36 considering that the gear change lever 58 and the connecting element 36 are fastened to one another for oscillation around the axis 22. As shown in FIG. 4, following a small oscillation of the connecting element 36 around the axis 22 in the direction shown by the arrow 24, the appendix 34 of the meshing unit 28 is distanced from the inner surface 62 of the support body 12. Consequently, under the action of the compressed spring 52, the meshing unit 28 oscillates around the pivot 50 and the tooth 32 engages the teeth 30. From the position illustrated in FIG. 4, the additional oscillation movement of the lever 58 around the axis 22 in the direction of the arrow 24 produces a rotation of the shaft 20 around the axis 22, thanks to the contact between the meshing unit 28 and the teeth 30. FIG. 5 illustrates the position of the gear change lever 58 at the end of its oscillation movement. The cyclist can choose the amplitude of the oscillation movement of the gear change lever 58 according to the number of gears to be shifted. Starting from the configuration in FIG. 5, when the cyclist releases the gear change lever 58, the return spring (not shown) associated to the connecting element 36 returns the connecting element and the gear change lever 58 to the home position shown in FIG. 3, while the shaft 20 is withheld in the new position by a retaining mechanism which is not described. The gear shift in the opposite direction is attained by means of a button (not shown arranged so to release said retainer mechanism.

As appears by comparing FIGS. 3 and 4, the gear change lever 58 must travel a very small angular stroke to take the meshing unit 28 into contact with the teeth 30. Reducing the approach stroke of the gear change lever 58 is advantageous because it increases the active stroke of the lever and, consequently, in equal conditions it is possible to reduce the diameter of the pulley on which the end portion of the derailleur control cable is wound.

What is claimed is:

1. Combined gear change and brake control unit for a bicycle comprising,
    a support body which can be fastened to the handlebar of the bicycle,
    a brake control lever pivotally mounted on the support body around a first axis,
    a gear change control unit connected to the support body, comprising a shaft turning around a second axis, either orthogonal or substantially orthogonal to said first axis, in which the gear change unit comprises a ratchet mechanism comprising a gear solidly connected to said shaft and a meshing unit, said meshing unit being pivotably connected to a connecting element which freely turns on said second axis and
    a gear change lever operatively associated to said ratchet mechanism for controlling the rotation of said shaft around said second axis, said gear change lever is fastened to said connecting element for the oscillation movements around said second axis and pivots on the connecting element around an axis, either orthogonal or substantially orthogonal to said second axis.

2. Unit according to claim 1, wherein said meshing unit pivots on said connecting element around an axis either parallel or substantially parallel to said second axis and associated with elastic means tending to make the meshing unit oscillate towards a meshed position with said gear.

3. Unit according to claim 2, wherein said meshing unit has an appendix which, in a home position of the gear change lever rests against an inner surface of the support body to hold the meshing unit in a released position with respect to said gear against the action of said elastic means.

4. Unit according to claim 1, wherein said connecting element has substantially the shape of a connecting rod.

5. Unit according to claim 1, wherein said connecting element comprises two elements, which are substantially annular arranged on opposite sides with respect to said gear.

6. Unit according to claim 5, wherein said substantially annular elements are equipped with respective extensions mutually joined by a base.

7. Unit according to claim 6, wherein one of said extensions is equipped with a pair of flanges, facing each other and parallel, to which said gear change lever is pivoted.

8. A bicycle gear change and brake control unit comprising:
    a support body for attachment to a handlebar of a bicycle;
    a brake control lever pivotally attached to the support body about a first pivot axis;
    a connecting element pivotally attached to the support body about a second pivot axis substantially orthogonal to the first axis;
    a gear lever pivotally attached to the connecting element about a third pivot axis substantially parallel to the first axis;
    a gear, having teeth, pivotally attached to the support body about the second pivot axis;
    a pulley shaft rigidly attached to the gear and aligned with the second pivot axis; and a meshing unit, pivotally attached to the connecting element about a fourth pivot axis substantially parallel to the second pivot axis, which selectively engages the teeth of the gear.

9. The control unit of claim 8, wherein the meshing unit includes an appendix rigidly mounted thereon which rests against an inner surface of the support body to prevent the meshing unit from engaging the gear in a home position of the gear lever.

10. The control unit of claim 9, wherein the meshing unit further includes a tooth rigidly mounted thereon, which selectively engages the gear, whereby a rotation of the gear lever in a first direction results in motion of the meshing unit relative to the inner surface and engagement of the tooth with the gear.

11. The control unit of claim 10, wherein the meshing unit includes a spring which biases the appendix against the inner surface in a home position, and which biases the tooth against the gear in a position corresponding to a full travel of the gear lever.

12. The control unit of claim 8, wherein the connecting element includes substantially parallel opposing plates aligned orthogonal with the second pivot axis, and wherein the gear and meshing unit are pivotally attached between the opposing plates.

13. The control unit of claim 12, wherein the connecting element includes a pair of flanges, substantially orthogonal to the opposing plates, and wherein the gear control lever is pivotally attached to the flanges.

* * * * *